United States Patent
Subramanian et al.

(10) Patent No.: US 7,597,838 B2
(45) Date of Patent: Oct. 6, 2009

(54) FUNCTIONALLY GRADIENT SIC/SIC CERAMIC MATRIX COMPOSITES WITH TAILORED PROPERTIES FOR TURBINE ENGINE APPLICATIONS

(75) Inventors: Suresh Subramanian, Mason, OH (US); James Dale Steibel, Mason, OH (US); Douglas Melton Carper, Trenton, OH (US); Toby George Darkins, Jr., Loveland, OH (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 11/027,403

(22) Filed: Dec. 30, 2004

(65) Prior Publication Data
US 2006/0147688 A1    Jul. 6, 2006

(51) Int. Cl.
*B32B 17/12* (2006.01)
*B32B 15/04* (2006.01)
*C04B 35/00* (2006.01)
*C04B 33/34* (2006.01)
*C04B 35/64* (2006.01)

(52) U.S. Cl. .................. 264/640; 428/293.4; 428/297.1; 428/297.4; 428/297.7; 428/294.1; 264/605; 264/642; 501/95.2

(58) Field of Classification Search ............. 428/293.4, 428/293.7, 297.4, 297.7; 264/605, 642, 640; 501/95.2
See application file for complete search history.

(56) References Cited

U.S. PATENT DOCUMENTS

| | | |
|---|---|---|
| 4,642,271 A | 2/1987 | Rice |
| 5,026,604 A | 6/1991 | Thebault |
| 5,094,901 A | 3/1992 | Gray |
| 5,132,169 A | 7/1992 | Olry et al. |
| 5,134,020 A | 7/1992 | Cotteret et al. |
| 5,296,311 A | 3/1994 | McMurtry et al. |
| 5,407,740 A | 4/1995 | Jessen |
| 5,427,986 A | 6/1995 | Chyung et al. |
| 5,593,728 A | 1/1997 | Moore et al. |
| 5,707,471 A | 1/1998 | Petrak et al. |
| 5,738,951 A | 4/1998 | Goujard et al. |
| 5,817,432 A | 10/1998 | Chwastiak et al. |
| 5,851,568 A * | 12/1998 | Huang ........................ 425/356 |
| 5,945,062 A | 8/1999 | Chwastiak et al. |
| 5,955,391 A | 9/1999 | Kameda et al. |
| 6,291,058 B1 | 9/2001 | Goujard et al. |
| 6,350,713 B1 | 2/2002 | Petrak |
| 7,223,465 B2 * | 5/2007 | Subramanian et al. ... 428/293.4 |
| 2002/0019306 A1 | 2/2002 | Petrak |

* cited by examiner

*Primary Examiner*—D. Larazano Tarazano
*Assistant Examiner*—Camie S Thompson
(74) *Attorney, Agent, or Firm*—McNees Wallace & Nurick, LLC

(57) ABSTRACT

A ceramic matrix composite with a ceramic matrix and a gradient layering of coating on ceramic fibers. The coating typically improves the performance of the composite in one direction while degrading it in another direction. For a SiC-SiC ceramic matrix composite, a BN coating is layered in a gradient fashion or in a step-wise fashion in different regions of the article comprising the ceramic. The BN coating thickness is applied over the ceramic fibers to produce varying desired physical properties by varying the coating thickness within differing regions of the composite, thereby tailoring the strength of the composite in the different regions. The coating may be applied as a single layer as a multi-layer coating to enhance the performance of the coating as the ceramic matrix is formed or infiltrated from precursor materials into a preform of the ceramic fibers.

14 Claims, 4 Drawing Sheets

FUNCTIONALLY GRADIENT SIC/SIC CERAMIC MATRIX COMPOSITES WITH TAILORED PROPERTIES FOR TURBINE ENGINE APPLICATIONS

STATEMENT REGARDING FEDERALLY SPONSORED RESEARCH OR DEVELOPMENT

This invention was made with Government support under Contract No. N00421-00-3-0536. The government may have certain rights to the invention.

FIELD OF THE INVENTION

The present invention relates generally to ceramic matrix composite materials. More particularly, this invention is directed to the application of a gradient layer of boron nitride (BN) applied to silicon carbide (SiC) fibers within a fiber reinforced ceramic matrix composite to improve interlaminar strength.

BACKGROUND OF THE INVENTION

A gas turbine engine includes a compressor, a combustor and a turbine. The compressor includes a plurality of disks, each with arcuate blades extending from its periphery. The disks rotate rapidly on a shaft, drawing in air, compressing it and moving the highly compressed air downstream toward the combustor. In the combustor, the compressed air is mixed with metered fuel which is burned, generating hot gases. The hot gases flow to the turbine which comprises at least one disk having arcuate blades extending from its periphery. Energy is extracted from the hot gases by the blades, the hot gases striking the blades causing the disks to turn, which in turn rotates the shaft, powering the engine. The remaining gases passing through the turbine generate thrust to propel an aircraft.

The materials used in the turbine section, because of their exposure to high temperatures and because of the rapid rotation, have typically been comprised of high temperature superalloys. However, because of their light weight and high temperature capabilities, ceramic composite materials, such as SiC/SiC ceramic matrix composites, which exhibit favorable characteristics, have been considered for use in the turbine portion of the engine, such as in turbine engine blade applications. One of the drawbacks of this material has been its poor interlaminar properties. The primary cause for low interlaminar strength is the presence of a boron nitride coating, which is typically applied over the fibers to form an interface between the fibers and matrix, thereby increasing fracture toughness by allowing the load to be transferred to the fibers and absorb energy by promoting crack propagation along the fibers, or within the weaker fiber coating. This low interlaminar strength, by improving fracture toughness, reduces the tendency of the material to suddenly fail in a brittle mode. In many of the hot section applications such as combustion liners, HPT vanes, LP blades and shrouds, the thermal gradients and mechanical loads can result in significant local interlaminar stresses. Therefore, it is desirable to enhance the interlaminar strength of ceramic composites in local areas for many of these applications.

A number of techniques have been used in the past to manufacture turbine engine components, such as turbine blades using ceramic matrix composites. However, such turbine components, under normal operating conditions, are not subjected to uniform stress patterns, instead experiencing varying degrees of local stresses at different times and at different locations within the part during normal turbine operation. A turbine blade generally has a dovetail portion, an airfoil portion opposite the dovetail portion and an optional platform located between the dovetail portion and the airfoil portion. In the dovetail portion of turbine blades, relatively higher tensile stress regions are located in the outermost portion of the dovetail section. Ideally, the CMC component should be designed such that the component has a higher tensile strength in the region experiencing the higher tensile stresses. One method of manufacturing CMC components, set forth in U.S. Pat. Nos. 5,015,540; 5,330,854; and 5,336,350; incorporated herein by reference and assigned to the assignee of the present invention, relates to the production of silicon carbide matrix composites containing fibrous material that is infiltrated with molten silicon, the process herein referred to as the Silcomp process. The fibers generally have diameters of about 140 micrometers or greater, which prevents the manufacture of intricate, complex shapes, such as turbine blade components, by the Silcomp process.

Another technique of manufacturing CMC turbine blades is the method known as the slurry cast melt infiltration (MI) process. A technical description of such a MI method is described in detail in U.S. Pat. No. 6,280,550 B1, which is assigned to the Assignee of the present invention and which is incorporated herein by reference. In one method of manufacturing using the MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. By "silicon carbide-containing fiber" is meant a fiber having a composition that includes silicon carbide, and preferably is substantially only silicon carbide. The fiber may have a silicon carbide core surrounded with carbon, or in the reverse, the fiber may have a carbon core surrounded by, or encapsulated with, silicon carbide. These examples are exemplary of the term "silicon carbide-containing fiber" and are not limited to this specific combination. Other fiber compositions are contemplated, so long as they include silicon carbide.

Prior ceramic matrix composites, such as U.S. Pat. No. 4,642,271, to Rice may be suitable for producing a homogenous composite with favorable toughness characteristics and other inplane properties, but lack the interlaminar properties required for many turbine engine applications. Typical methods of improving interlaminar strength of SiC/SiC composites have utilized through thickness fiber reinforcement. T-forming and Z-pinning are examples of techniques used to introduce load carrying fibers in the through-thickness directions of composites and, thus, enhance interlaminar strength within desired regions. T-forming, as set forth in U.S. Pat. No. 6,103,337 to Moody, is a method by which fibers are inserted directly into a preform so that spacing, depth of penetration, and orientation can be controlled to produce 3-D fiber architectures with improved interlaminar strength. Z-pinning is a technique used to reinforce a composite structure to prevent various layers rigidly connected to one another and from delaminating. These methods, however, require trade-offs in in-plane mechanical properties and result in significant increases in fiber and/or manufacturing costs.

Accordingly, there is a need for a method of producing a composite that possesses regions of favorable in-plane properties and regions of favorable interlaminar properties, thereby overcoming the inadequacies of the prior art.

SUMMARY OF THE INVENTION

The present invention is directed to a ceramic matrix composite with improved interlaminar strength in selected regions. The present invention provides a method of applying an interface coating thickness to a fiber preform. The physical properties of a ceramic composite material manufactured from the preform of the present invention will vary along or across a composite section. In this manner, desired physical properties of the material can be varied in different regions of the composite article to correspond to, for example, the actual stresses experienced in the specific regions of the article.

In one embodiment, the present invention provides a method of manufacturing a ceramic fiber preform, for use in a ceramic matrix composite, that includes forming a fiber preform with a plurality of ceramic fibers. The ceramic fibers are provided with an interface coating, such as BN. The thickness of the interface coating applied to the ceramic fiber is dependent upon the location of the fiber within the preform. The coating thickness applied to the fibers is variable. The thickness of the coating on the fiber is related to the physical properties required in the region of the preform in which the fiber is located. In this manner, the coating applied to the ceramic fibers is graded, that is to say, the coating applied to the fibers is not uniform across the preform, but rather varies in thickness depending upon the region of the preform in which the fiber is assembled, thereby producing an article with non-uniform, or graded, mechanical properties through its section.

In another embodiment, the present invention provides a method of manufacturing a component or article, such as an article for use in a gas turbine engine, the component having tailored mechanical properties. The method comprises first identifying distinct regions of a composite structure wherein different mechanical properties are required, and predicting the required mechanical properties. The method then requires a determination of a desired coating thickness applied to ceramic fibers to achieve the predetermined mechanical properties, with different thicknesses applied to achieve different mechanical properties. Fibers having the required coating thickness to achieve the predetermined mechanical properties are assembled within the preform so as to have regions in which coating thickness varies to produce different mechanical properties. The preform is then formed into a composite structure by any convenient method to produce a composite component having graded mechanical properties, the properties varying across the structure as a result or the varying coating applied to the ceramic fibers. The preform and the finished article may have graded mechanical properties that are continuously graded, in that the mechanical properties vary incrementally across the article due to slight variations in coating thickness. Alternatively, the article or component may have mechanical properties that vary across the article by providing distinct regions, each region having different mechanical properties than an adjacent region by providing ceramic fibers in one region having a different coating thickness than ceramic fibers in an adjacent region. In this embodiment, the mechanical properties within any one region may be substantially uniform.

In a further embodiment, the present invention provides a ceramic matrix composite with tailored properties that includes a ceramic matrix, a plurality of ceramic fibers disposed through the ceramic matrix, wherein the matrix is bonded to the fibers, and a coating on the ceramic fibers, wherein the coating thickness is instrumental in determining the strength of the bond between the fibers and the matrix, the coating thickness being varied in a predetermined manner on adjacent regions of fibers to produce adjacent regions of varying strength. The coating thickness may approach or be zero and may be a monolayer of a single coating material having a thickness of about 1 micron ($\mu$). The coating may also be applied as multiple layers of coating material of different compositions to a thickness of about $3\mu$, each layer having a thickness of up to about $1\mu$.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
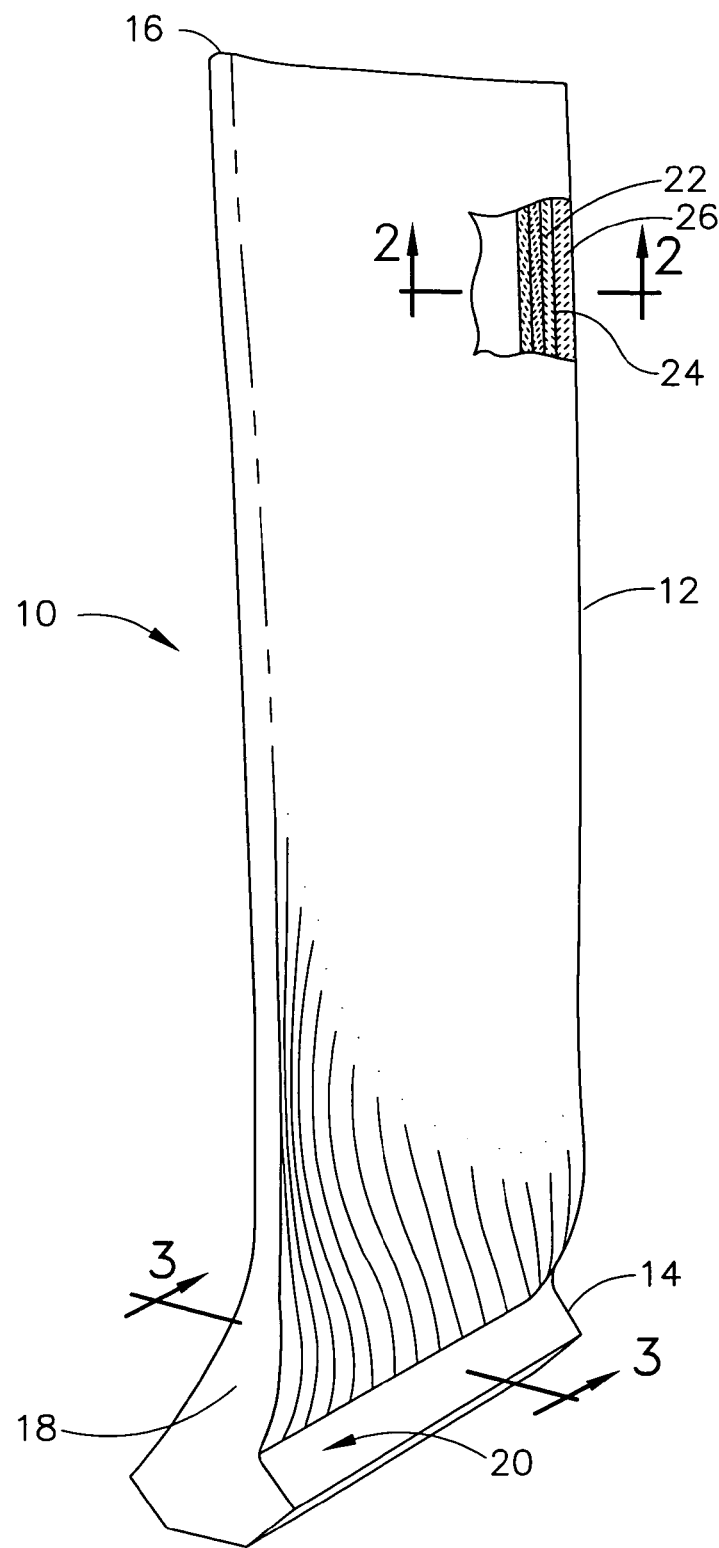
FIG. 1 is a perspective view of a turbine blade of an aircraft engine.

FIG. 1 illustrates a turbine blade 10 such as typically used in a gas turbine engine (not shown). The turbine blade includes an airfoil portion 12 and a dovetail portion 14. Although a turbine blade may optionally include a platform portion positioned between the airfoil portion 12 and the dovetail portion 14, the embodiment shown in FIG. 1 does not include the optional platform portion. Airfoil portion 12 is defined by the airfoil, which extends from the airfoil tip 16 toward an intermediate portion 18, where airfoil portion 12 widens into dovetail portion 14. Dovetail portion 14 includes a contoured outer surface 20 that is used to secure the turbine blade 10 in the disk or rotor (not shown) of the gas turbine engine. The dovetail portion seats into a corresponding dovetail slot formed in the periphery of the rotor. It will be appreciated that blade 10 experiences maximum mechanical stresses within dovetail portion 14 during engine operation and that thermal stresses within dovetail portion 14 are greater in the hotter sections of the engine as the blade dovetail is pushed against the interfacing forces of the disk by the rotational forces of the engine. It will be appreciated that the maximum rotationally speed of the turbines occurs when the temperatures produced by the combustor are highest, as more fuel is burned to produce more power. In accordance with this invention, blade 10 is a ceramic matrix composite constructed of ceramic fibers 22 provided with an interface coating 24, the coating applied to the fibers to form an interface between the fibers 22 and a matrix 26, infused into the interstitial spaces between fibers 22.

Figure 2:
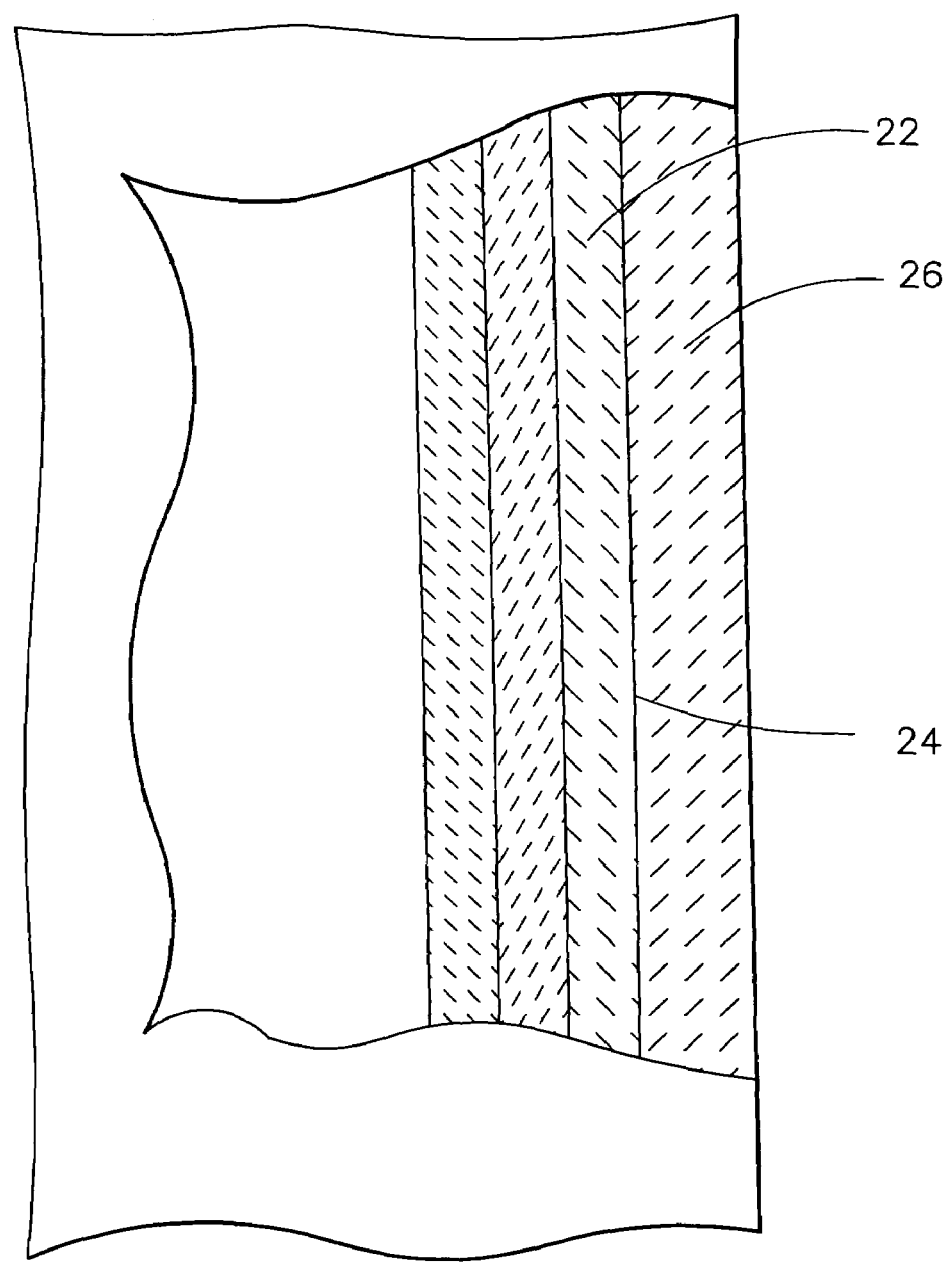
FIG. 2 is an enlarged sectional view of blade of FIG. 1, taken along the line 2-2.

FIG. 2 is an enlarged view of the internal structure of the CMC blade 10, illustrating, in simplistic form, ceramic fibers 22 with an interface coating 24 applied thereon. Preferably, the ceramic fibers 22 are SiC. However, the present invention is not limited to turbine blade structures, and other uses of the present invention both within a gas turbine engine and in other applications are envisioned. Another application within a gas turbine engine is, for example, as a compressor blade in the compressor, which operates at considerably lower temperatures. Other suitable fibers that may be used, depending on the specific application, include silicon nitride, aluminum oxide, silicon-nitrogen-carbon, silicon carbide sheath overlying a carbon core, aluminum borate, silicon oxide, silicon carbide that includes a metal, such as titanium or nickel, silicon oxycarbides, carbon and the like.

Figure 3:
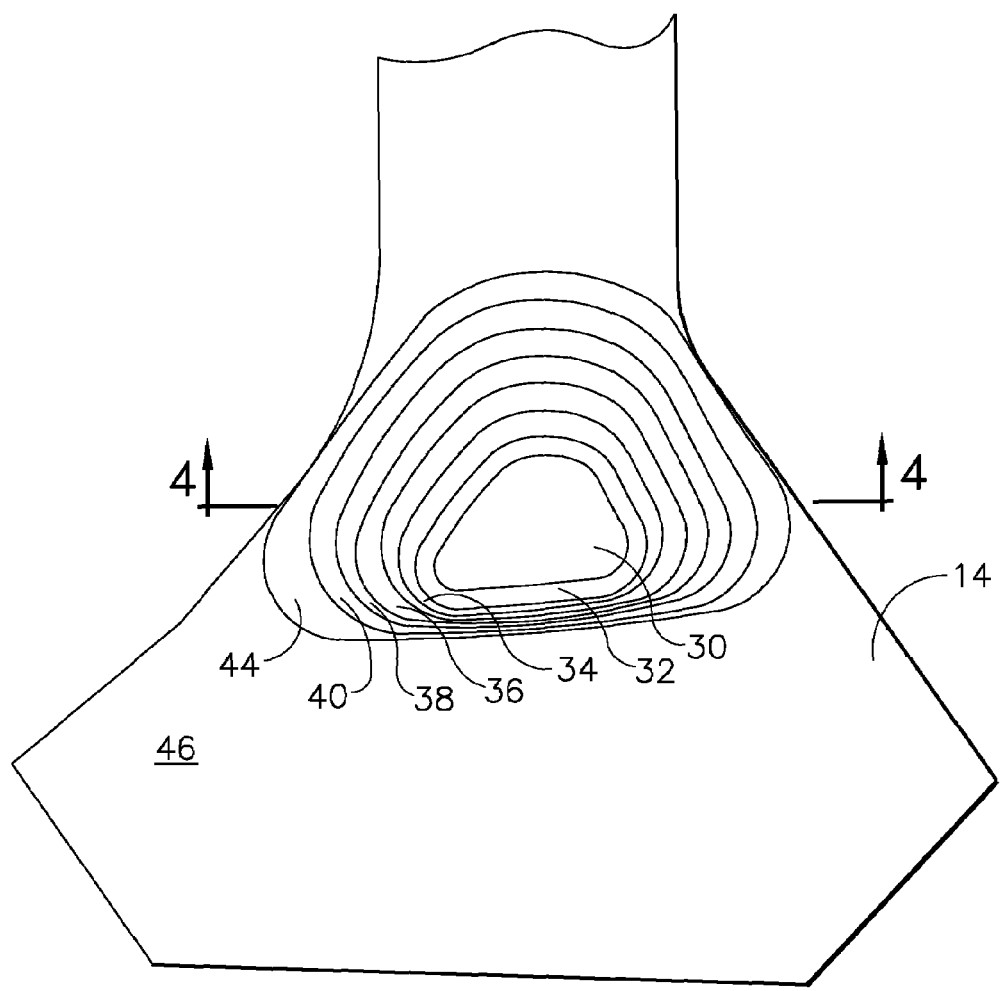
FIG. 3 is a calculated ANSYS™ interlaminar stress pattern of the dovetail portion of the blade of FIG. 1 taken along line 3-3, indicating the different stress regions across the dovetail cross-section.

With reference to FIG. 3, dovetail portion 14 is illustrated in greater detail. FIG. 3 further illustrates the calculated ANSYS™ interlaminar stresses within nine separate regions of dovetail portion 14. These regions, labeled 30, 32, 34, 36, 38, 40, 42, 44, and 46, experience differing interlaminar and in-plane stresses during engine operation. In the example provided, region 30 experiences high interlaminar stress and low in-plane stress when compared to the other regions. Similarly, region 46 experiences high in-plane stress and low interlaminar stress when compared to the other regions. The interlaminar stresses decrease progressively from region 30 to region 46, while the in-plane stresses increase progressively from region 30 to region 46. It is clear from FIG. 3, that different portions of the article, here a turbine blade, are subjected to different stresses, and materials properties that are suitable for use in one location may be unsuitable in another location under the same environmental conditions.

Figure 4:
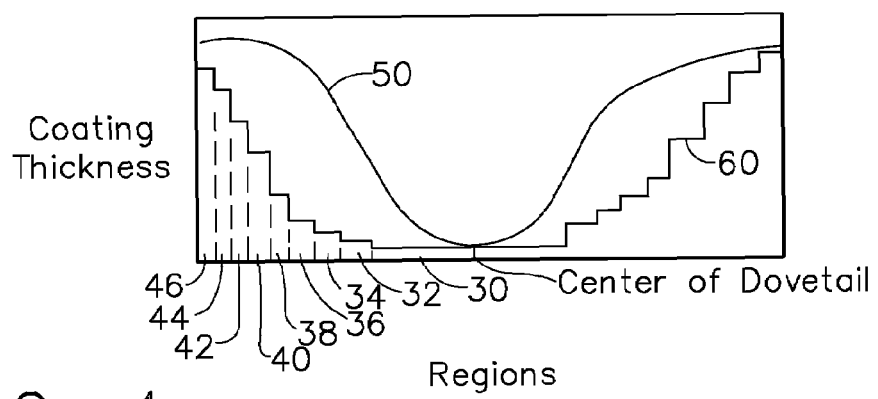
FIG. 4 is a graphical representation of the fiber coating thickness as measured along line 4-4 of FIG. 3.

FIG. 4 graphically illustrates the thickness of interface coating 24 on fibers 22, measured along the line 4-4 of FIG. 3 for an embodiment of the invention. Line 50 graphically represents the thickness of coating 24 in each region 30, 32, 34, 36, 38, 40, 42, 44, and 46, wherein region 30 has a very thin application of interface coating 24 than other regions, the interface coating increasing with in-plane stresses inversely to interlaminar stresses. The thickness of the interface coatings 24 varies from a minimum or zero in region 30 where the in-plane stresses are at a minimum. The maximum thickness of the interface coating can vary dependent upon the make-up and form of the interface coating. When the interface coating comprises a plurality of thin layers of differing composition, the thickness of the layers can be up to 3.0 microns (μ). When the interface coating is a monolithic layer of BN, the thickness of the coating typically is 1μ. The thickness of coating 24 will depend upon the types of stresses and the value of the stresses present in the region in which the fiber is located. Thus the range of thickness of the coating is stress dependent, and will vary from application to application. For an article having a stress distribution pattern such as the blade cross-section depicted in FIG. 3, the thickness of the coating varies in a manner as shown in FIG. 4.

For an article such as a turbine blade, having a coating thickness with a thickness pattern such as shown in FIG. 4, the coating distribution pattern can be achieved in any acceptable manner. In one embodiment, the coating distribution of the fibers can readily be achieved by drawing the fibers through a solution of the coating. Thickness of the coating can be varied by controlling the dwell time of the fibers in the solution. A thicker coating is achieved by varying the speed at which the fibers are drawn through the solution. Once the fiber tows have been coated in this manner, the fibers can be drawn through a solution of matrix to form a prepreg sheet or ply. The prepreg plies are then cut and laid up so that the prepreg plies having a thin coating are located in the region of the layup having the highest interlaminar stresses, while the prepreg plies having the thickest coating are located in the region having the highest in-plane stresses. After the desired lay-up is achieved, the prepreg plies are consolidated to form a ceramic matrix composite by application of heat and pressure for a preselected time. Consolidation is preferably accomplished by applying a pressure of about 100-250 psi at a temperature of about 100-200° C. (about 212-392° F.) for about 12-36 hours. The final ceramic matrix composite blade that results from this process is a blade in which there is some bonding between the matrix and the fibers in the areas in which the interlaminar stresses are high. The material acts monolithically in this region, which is desirable in the region of interlaminar stresses. In areas where the in-plane stresses are high, there is a thick coating between the matrix and the fibers, which may result in some slippage between the matrix and the fibers. The coating allows the load to be transferred from the matrix to the fibers so that the stress can be transferred to the fibers so as not to overstress the matrix, which could fail in a brittle manner.

In another embodiment, the distribution of coating thickness of the fibers in which the coating thickness of the inner fibers, or the fibers comprising the inner portion of the preform, is thinner than the coating thickness of the outer fibers, or fibers comprising the outer portion of the preform, such as is required for a turbine blade, can be achieved as follows. A fiber preform using uncoated fibers is first laid up. The fiber preform is then exposed to a chemical vapor infiltration process in which the vapor comprises the coating material. The coating vapor infiltrate the preform, depositing coating material on the unexposed fibers. The thickness of the deposited coating will be thinner in the inner fibers of the preform and thicker on the exterior fibers of the preform. The coating thickness can be further varied by varying the partial pressure of the coating vapor so as to control the concentration of vapor reaching the interior fibers. After the desired coating thickness and distribution has been achieved, the preform can be melt-infiltrated with matrix material using the slurry cast melt infiltration process so as to achieve a ceramic matrix composite material.

This technique is effective for an article such as a turbine blade in which the coating thickness of the fibers on the interior of the preform is thinner than on the exterior. However, when the stress distribution pattern of the article is reversed, requiring a thicker coating applied to the fibers on the interior of the article preform, the coating thickness distribution can be achieved by applying a mask to fibers on the exterior of the preform before exposing the preform to the coating vapors. After the desired coating thickness has been achieved in the interior of the article preform, the mask material can be removed and the fibers on the exterior of the preform can be coated. Although the thickness distribution will not be a mirror image of the distribution shown in FIG. 4, the general pattern will provide a thicker coating in the interior and a thinner coating in the exterior of the preform. The preform can then be slurry cast melt infiltrated in the conventional manner.

In yet another embodiment, fibers can be provided with a coating and a preimpregnated (prepreg) matrix, the fibers grouped in accordance with the coating thickness applied to the fibers. The coated fibers in each grouping can have a uniform coating thickness along their length, or the fibers may have a coating thickness that varies along the fiber length. This variable thickness can be obtained, for example, in a manner such as described above for formation of prepreg sheets. The article can be subdivided into a plurality of sectors, such as the eight sectors represented by regions 30-46 in FIG. 3. The fibers can be grouped into an appropriate number of sectors, here eight sectors, according to the coating thickness applied to the fibers. Each group of fibers can then be assembled into a preform so that a plurality of fibers having a thin interface coating, or no interface coating, is assembled at a location corresponding to region 30. Then, additional groups of fiber are assembled into regions 32-46 as a function of coating thickness, with the fibers with the thickest coating assembled in region 46, thereby providing a preform having fibers with a stepwise coating thickness gradient. It will be appreciated that while this technique provides a gradient that varies from a thin (or no) coating in the interior, to a thick coating on the exterior corresponding to low interlaminar stresses on the exterior and high interlaminar stresses in the interior, the fibers can be arranged to correspond to high interlaminar stresses on the exterior and low interlaminar stresses in the interior, or, if dictated by the stress distribution pattern, alternating high and low interlaminar stresses across a cross-section. It will also be appreciated that the coating thickness along the fiber length can be graded, so that one portion of a fiber or group of fibers may be in a section of high interlaminar stresses, while another portion of a fiber or group of fibers may be in a section of low interlaminar stresses. Thus, the preform layup can reflect the variation in thickness along the length of the fibers (and hence the axis of the article) as well as across the cross section of the part. After the preform has been assembled with the prepreg sheets, the preform can be melt infiltrated to achieve a ceramic matrix composite material as previously discussed.

Preferred diameters for the fibers used in the composites of the present invention vary in the preferred embodiment from about 5-20 microns ($\mu$) in diameter, and most preferably from about 10-15$\mu$ in diameter. These values do not include coating thicknesses, the application of which may vary from location to location within the CMC article. The applied coating thickness (t) will increase the diameter of the fiber by the value of 2t, depending on the coating thickness at a given location. Since in certain locations the coating thickness may be as high as 5$\mu$, the overall diameter of the fibers will be accordingly increased by as much as 2t or 10$\mu$, or from 10$\mu$ to 25$\mu$.

As noted above, the fiber coatings may be monolithic BN. The fiber coating thickness will vary depending upon the stress intensity and type of stress (in-plane v. interlaminar) to which the fiber is subjected. For a monolithic BN interface coating, the interface coating thickness can vary from no coating in a region of high interlaminar stresses (and low in-plane stresses to a coating thickness of about 1$\mu$ in regions subjected to in-plane stresses.

It would be appreciated that the process described herein, while preferably directed to SiC/SiC composites with a BN fiber coating, may be accomplished with other composite and coating materials to produce the desirable material properties. For example, because certain processing of the preform into a ceramic matrix composite, such as for example infiltration processes, can cause damage or deterioration to BN coatings, it is sometimes desirable to apply the interface coating as a plurality of layers. In one embodiment, the coating comprises four layers. Each layer has a specific purpose, and fewer or more layers may be used as required. Of course, such an interface coating is desirable in regions in which it is important to maintain the BN coating as a distinct coating. Thus, the interface coating applied as a plurality of layers is preferred in regions in which there is high in-plane stress, because it is desirable to prevent the matrix from interacting with the fibers, thereby allowing the stresses to be transferred from the matrix to the fibers. The layer immediately adjacent to the fibers is BN, which is useful in providing the slip between the fiber and the matrix. However, BN is susceptible to oxidation, particularly in the presence of $H_2O$ (steam), thus a more oxidation resistant Si—BN overlayer is applied. The BN-containing layers have a tendency to react with molten silicon carbide. Thus, to protect the BN coating and Si-doped BN overlayer, an overlayer of silicon nitride (SiN). Is applied. Optionally, a layer of carbon is applied over the SiN. The optional carbon layer, applied to a thickness up to about 0.1$\mu$, and preferably about 0.05$\mu$ promotes interaction at the interface of the SiN with any molten Si. The carbon promotes infiltration of the molten silicon, improving preform "wetting" with silicon and formation of SiC. The SiN may decompose if molten Si penetrates it, but again this decomposition is designed to protect the underlying BN. This layer is applied to a thickness of about 0.75$\mu$-1.25$\mu$. The Si doped BN layer is applied to a thickness in the range of about 0.4-0.6$\mu$. In areas in which there are high interlaminar stresses, and interactions between the fibers and the matrix are helpful in preventing the fibers from acting as defects with respect to the stresses, such multilayer coatings are not desired, as they can inhibit such interactions. All of the fibers in a preform may be coated with the multilayer system or only preselected fibers may be coated with the multilayer system. The coating systems can thus be varied depending upon the stress distribution patterns that are anticipated and the interactions required between the fiber and the matrix as a result of these stresses.

The overall coating thickness of the above-described layer can approach 3$\mu$, which is effective in promoting a maximum transfer of stress to the fiber. Less transfer can be achieved with a thinner coating. For an intermediate system, in which stress is transferred to the fiber, but not the maximum amount possible, BN can be applied to a thickness of about 0.3$\mu$, the Si-doped layer can be applied to a thickness of about 0.3$\mu$ and the SiN can be applied to a thickness of about 0.5$\mu$. Of course, minimal transfer of stress can be obtained by allowing the SiC fiber to react with the SiC matrix, even to the point of forming a monolithic material by allowing a complete reaction.

The acceptable coating are not limited to the BN or to the multilayer system described above. Other acceptable coatings that can be substituted entirely or combined in layers with BN layers as part of a multi-layer system include for example, $Si_3N_4$, SiC, aluminum nitride and carbon. These coatings can be applied individually up to 1$\mu$ or as coatings in a system wherein the thickness of the coating system can be up to 3$\mu$.

While SiC is a preferred matrix, other matrix materials may also be used with the graded coated fibers of the present invention. Two other acceptable matrices include silicon-nitrogen-carbon matrices and aluminum silicates matrices. Articles can be fabricated from these matrices using the above slurry cast melt infiltration techniques, the prepreg techniques described above, or any other acceptable technique, such as polymer impregnation pyrolysis (PIP). Various organosilicon preceramic polymers may be used to form the silicon based matrices. These prepolymers include, but are not limited to polysiloxanes, polysilazanes, polysilanes, polymetallosiloxanes and the like. The material used to form the matrix is not important, as long as the matrix can be formed around the fiber to achieve the desired result depending upon the type and intensity of stresses anticipated and experienced at the interface between the fiber and the matrix, as discussed above.

Figure 5:
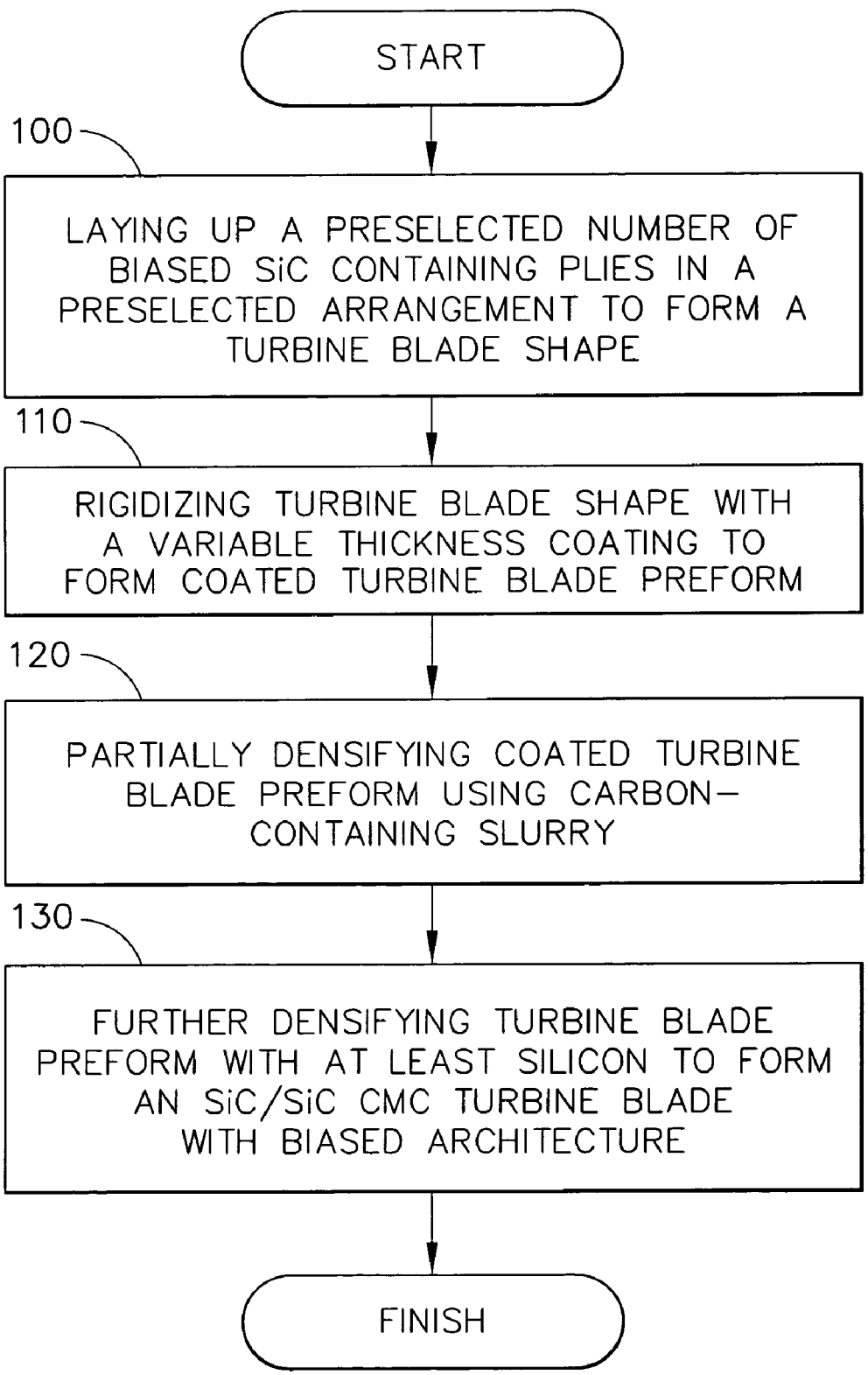
FIG. 5 is a flow chart illustrative of a method in accordance with the present invention.

Referring now to FIG. 5, there is shown a flow chart illustrating a slurry cast MI method of manufacture an embodiment of the present invention to produce a CMC turbine blade. The initial step 100 of the process is laying up a preselected number of biased SiC containing cloth plies of preselected geometry in a preselected arrangement to form a turbine blade shape, or preform. In a preferred embodiment, there are a preselected number of fiber tows woven in the weft direction sufficient to allow the SiC cloth to be handled and laid up without falling apart. A CMC element manufactured with biased SiC containing cloth plies has greater tensile strength in the warp direction of the SiC containing cloth plies than the weft direction. The tensile strength in the warp direction is up to about 25 percent greater than in the weft direction.

Once the plies are laid up, the next step 110 is to rigidizing the turbine blade shape with BN. As is known, an applied BN coating on SiC fibers in a SiC matrix provides a weaker bond between fibers 22 and matrix 26. In step 110, the thickness of coating 24 is varied across differing regions, such as regions 30, 32, 34, 36, 38, 40, 42, 44 and 46 of FIG. 3, to tailor the strength within each region to desired amounts. The desired amounts of coating required for fiber in a designated region may be known from extensive destructive testing, or from computer simulations that predict the stresses, and therefore desired strengths, within each region. The coating thickness can be varied by any of the techniques set forth above that will produce a uniform and predictable thickness for the fiber in the region. In a preferred embodiment, the method includes applying BN coatings using a chemical vapor infiltration (CVI) process, forming a rigid coated turbine blade preform. Thus provided, the thickness of BN can be varied across the preform regions 30, 32, 34, 36, 38, 40, 42, 44 and 46 to increase desired strengths in desired regions. A uniform coating thickness of BN applied to the fibers in a preform is known to provide the final CMC component with improved mechanical properties, including improved modulus of elasticity, improved tensile strength, and improved fracture toughness through the component, however, very few components experience consistent levels of stresses throughout. However, a preform having fibers with graded thicknesses should better be able to survive the varied types of stresses (i.e. interlaminar, in-plane through-thickness) experienced by the article or component in service as compared to fibers having a uniform coating thickness.

The next step 120 partially densifies the coated turbine blade preform by introducing a carbon-containing slurry, as is known in the art, into the void areas between the fibers of the coated turbine blade preform. The final step 130 further densifies the turbine blade preform with at least silicon, and preferably boron doped silicon, through a slurry cast MI process, in which the silicon reacts with carbon to form a SiC matrix, the final part being a SiC/SiC CMC turbine blade with biased architecture.

For a preselected fiber/matrix combination, the grading of the coating will be varied depending upon the measured or predicted stress patterns and intensities to permit the use of CMC's in applications in which they were heretofore not able to be used. Thus, the grading of the coating applied to the fibers to control the interaction of the fibers with the matrix based on measured or calculated stress patterns and intensities will vary depending upon the location, and therefore the stress pattern within the CMC article. For example, a thin coating may be applied in an area of the article where stress intensity for interlaminar stresses is high, while an adjacent region may have a thick coating to accommodate higher in-plane stresses. So therefore, coating thickness may vary from as low as 0.5µ total to as high as 5µ total.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a ceramic fiber preform for use in a ceramic matrix composite, the method comprising:
   providing a fiber preform having a plurality of ceramic fibers;
   defining a plurality of regions of the fiber preform on the basis of variations in the desired level of resistance to in-plane stress and variations in the desired level of resistance to interlaminar stress among corresponding regions of the ceramic matrix composite, the plurality of regions including a first region and a second region;
   applying BN to the first region, yielding a first BN layer having a thickness in the range of about 0.3 micron to about 1.0 micron;
   applying BN to the second region, yielding a second BN layer having a thickness of less than or equal to about 0.3 micron;
   applying Si-doped BN to the first BN layer, yielding a first Si-doped BN layer having a thickness in the range of about 0.4 micron to about 0.6 micron;
   applying Si-doped BN to the second BN layer, yielding a second Si-doped BN layer having a thickness of less than or equal to about 0.3 micron;
   applying SiN to the first Si-doped BN layer, yielding a first SiN layer having a thickness in the range of about 0.75 micron to about 1.25 micron, thereby forming a first multilayer fiber coating corresponding to the first region; and
   applying SiN to the second Si-doped BN layer, yielding a second SiN layer having a thickness of about 0.5 micron, thereby forming a second multilayer fiber coating corresponding to the second region.

2. The method of claim 1, wherein the ceramic fiber is selected from the group consisting of SiC, $Al_2O_3$ and Si—N—C.

3. The method of claim 1, wherein the thickness of the first BN layer is about 0.3 micron.

4. The method of claim 1, wherein the thickness of the second BN layer is about 0.3 micron.

5. The method of claim 1, wherein the thickness of the second Si-doped BN layer is about 0.3 micron.

6. The method of claim 1, further including applying carbon to the first SiN layer, yielding a carbon layer having a thickness of less than or equal to about 0.1 micron.

7. The method of claim 1, further including applying carbon to the first SiN layer, yielding a carbon layer having a thickness of about 0.05 micron.

8. The method of claim 1, wherein the plurality of regions includes a third region, and further including applying BN to the third region, yielding a BN monolayer having a thickness of about 1.0 micron.

9. The method of claim 1, wherein the plurality of ceramic fibers essentially includes only ceramic fibers having a diameter in the range of about 5 microns to about 20 microns.

10. The method of claim 1, wherein the plurality of ceramic fibers essentially includes only ceramic fibers having a diameter in the range of about 10 microns to about 15 microns.

11. The method of claim 10, wherein the plurality of ceramic fibers consists essentially of ceramic fibers composed of SiC.

12. The method of claim 1, wherein the first region and the second region are contiguous.

13. The method of claim 12, wherein a gradient is defined by the first multilayer fiber coating and the second multilayer fiber coating.

14. The method of claim 1, wherein the first region and the second region are not contiguous.

* * * * *

UNITED STATES PATENT AND TRADEMARK OFFICE
CERTIFICATE OF CORRECTION

PATENT NO. : 7,597,838 B2  Page 1 of 1
APPLICATION NO. : 11/027403
DATED : October 6, 2009
INVENTOR(S) : Subramanian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Twenty-eighth Day of September, 2010

David J. Kappos
*Director of the United States Patent and Trademark Office*